Sept. 11, 1934. L. C. HUSE 1,973,284
MEAT TENDERING MACHINE
Filed Sept. 2, 1932 2 Sheets-Sheet 1

Inventor
Leon C. Huse
by Roberts, Cushman & Woodbury
Att'ys.

Sept. 11, 1934.　　　　　L. C. HUSE　　　　　1,973,284
MEAT TENDERING MACHINE
Filed Sept. 2, 1932　　　2 Sheets-Sheet 2

Inventor
Leon C. Huse
by Roberts, Cushman & Woodbury
Attys.

Patented Sept. 11, 1934

1,973,284

UNITED STATES PATENT OFFICE 1,973,284

MEAT-TENDERING MACHINE

Leon C. Huse, Laconia, N. H.

Application September 2, 1932, Serial No. 631,514

8 Claims. (Cl. 17—26)

This invention relates to an improved meat tendering machine and particularly to a machine adapted effectively to treat relatively tough slices of meat by suitable rolls provided for example with cutting disks and/or ribs.

In accordance with this invention, a pair of treating rolls is arranged with suitable guide means to direct the slice of meat therebetween while preventing the meat from clinging to the rolls, and a supporting frame is afforded for the rolls and guiding means to permit their ready removal from the frame of the machine for cleaning purposes. More particularly a machine constructed in accordance with the present invention may have a pair of rolls with axial extensions or shafts supported by uprights or plates at opposite ends of the machine, one of said plates being pivotally connected to the fixed frame portion of the machine and held in place by a resilient tie-bar so that this plate may be swung downwardly when the tie-bar is swung out of its normal position, thus to release the rolls from the plates and permit their ready removal from the machine. A feeding table is provided in front of the rolls to facilitate the feeding of meat between the rolls and suitable guide wires are associated with this table. Preferably spaced sets of wires are afforded for this purpose, these wires extending between portions of the rolls and being arranged to engage opposite surfaces of the meat slice so that clinging of the meat to the rolls is prevented. Suitable driving mechanism in the form of gears associated with the respective shafts or axial extensions of the rolls is afforded, one of these shafts being extended to receive a driving element such as a hand crank.

In the accompanying drawings.

Figure 1:
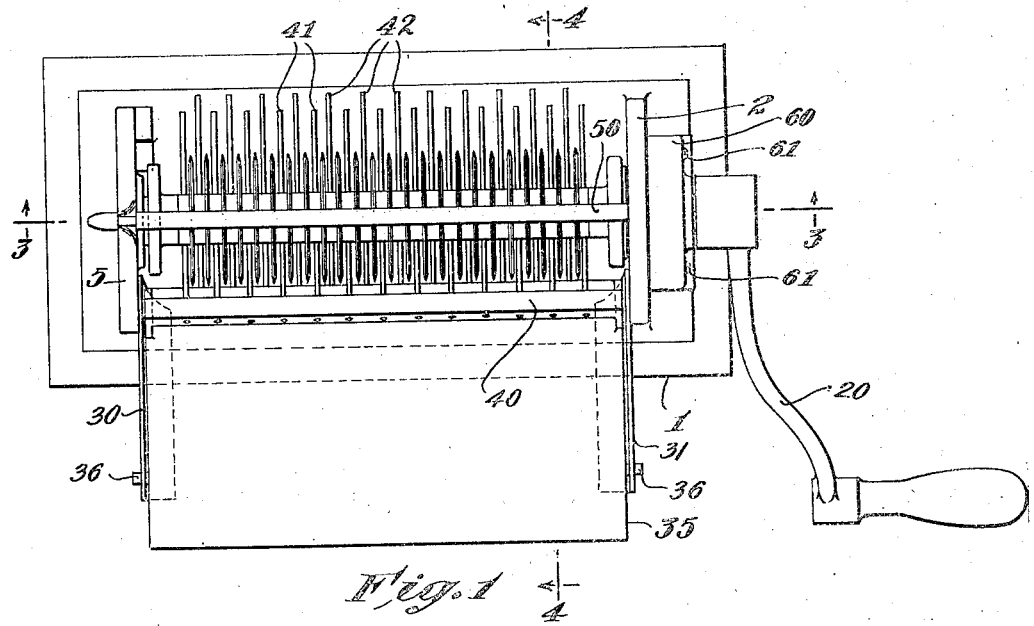
Fig. 1 is a top plan view of a typical machine embodying the principles of this invention.
Figure 3:
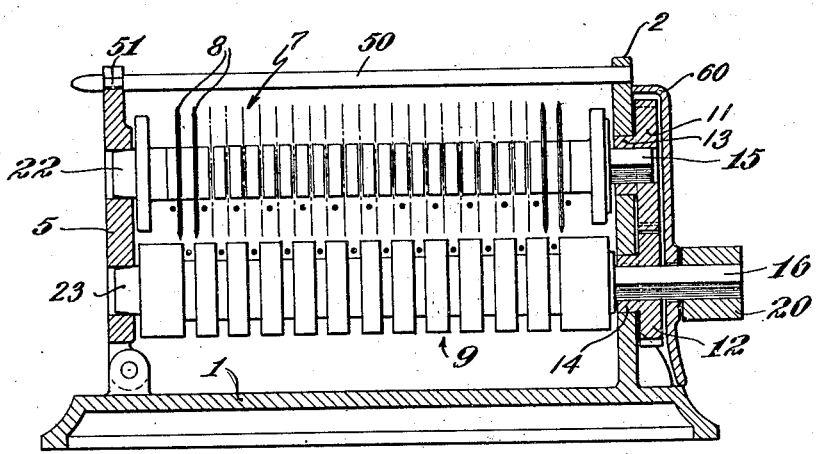
Figure 4:
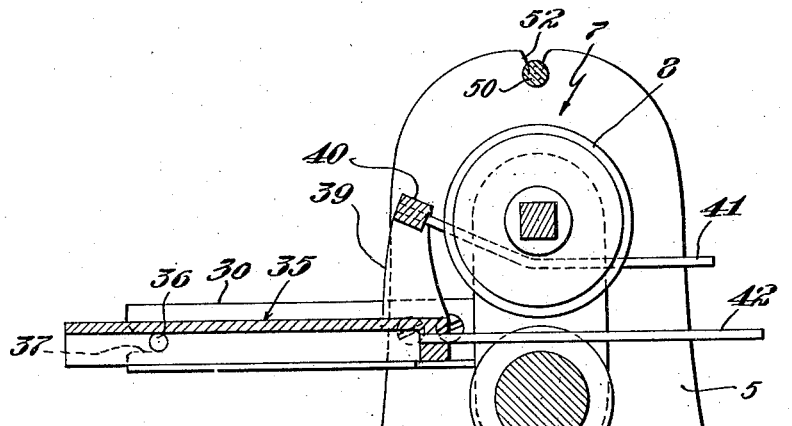

Fig. 3 is a central section indicated by line 3—3 of Fig. 1;

Fig. 4 is a section indicated by line 4—4 of Fig. 1; and

Figure 5:
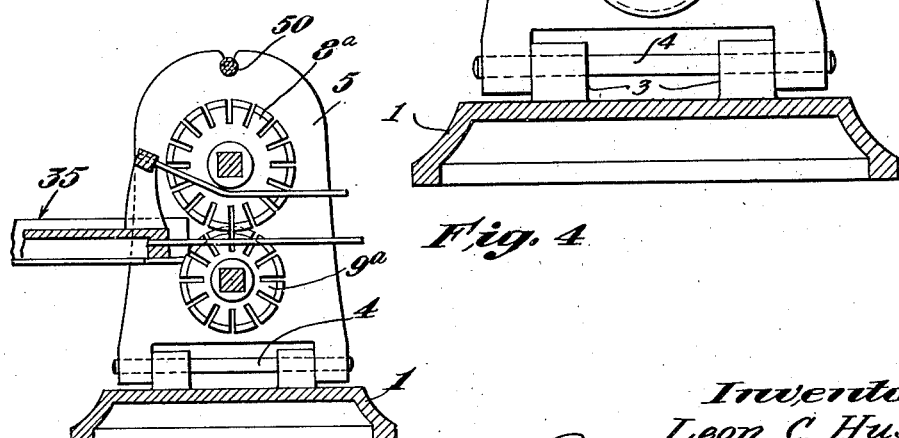

Fig. 5 is a section similar to Fig. 4 but showing an optional embodiment of the invention.

Figure 2:
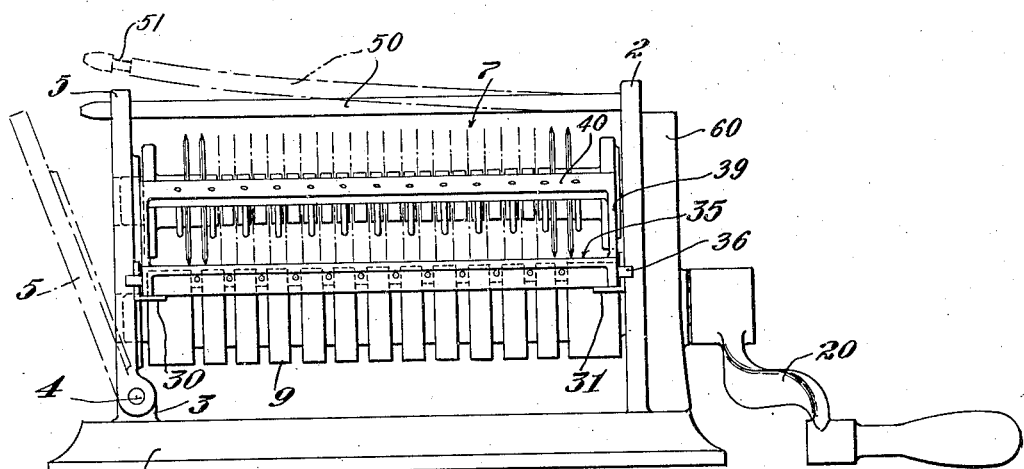
Fig. 2 is a front elevation of the machine, the movable end plate and the resilient tie-bar being illustrated in optional positions by dot and dash lines.

As shown in the accompanying drawings, a machine constructed in accordance with this invention is provided with a frame consisting of a fixed metal base 1 having an integral standard or end plate 2 and providing integral lugs 3 which receive a hinge pin or pintle 4 supporting the lower end of a pivotally mounted end plate 5, the parts being arranged so that the end plate 5 may swing downwardly about a substantially horizontal axis as indicated by dot and dash lines in Fig. 2. Suitable meat tendering rolls are rotatably mounted in cooperating relation upon the end plates 2 and 5. Thus, for example, as shown in the accompanying drawings the upper roll 7 may include a plurality of disks 8 which may be provided with relatively sharp beveled peripheries, while the lower roll 9 may be provided with a plurality of circumferential ribs separated by grooves. It is contemplated, however, that other types of meat treating rolls may be substituted for the preferred roll arrangement illustrated herewith as, for example, both the upper and lower rolls may be provided with cutting disks similar to those afforded upon the roll 7. As shown the peripheries of the rolls 7 and 9 are slightly spaced (Fig. 4).

Rotatably mounted upon the fixed standard 2 are upper and lower gears 11 and 12 (Fig. 3) which have hubs 13 and 14 respectively, rotatably engageable with openings in the plate 2. These hubs are provided with non-circular or square openings engaging axial extensions 15 and 16 of the rolls 7 and 9, these extensions as shown preferably being of generally square cross section, but having a slight taper toward their ends to facilitate their interengagement with the openings in the gear hubs. The gears 11 and 12 are in meshed engagement with each other and the axial extension 16 of the lower roll 9 projects through the gear 12 to provide a shank in interfitting engagement with a detachable crank 20. The opposite ends of rolls 7 and 9 are provided with axial extensions 22 and 23 respectively which engage corresponding openings in the swinging upright 5. The extensions 22 and 23 are relatively narrow and have tapered end portions so that they may be disengaged from the plate 5 when the latter is swung to the dotted line position shown in Fig. 2, thus permitting the extension 15 of roll 7 to be slid out of engagement with the hub of the gear 13 and permitting a similar disengagement of the extension 16 of roll 9 from the corresponding gear and from the crank 20. A detachable cover 60 through which shank 16 extends may be disposed about gears 11 and 12, being held in place by fastening elements 61.

A resilient tie-bar 50 may have one end fixed in the stationary upright 2 and may have its opposite end provided with a notched portion or portion of reduced diameter, designated by numeral 51 engageable in a shallow slot 52 in the upper end of plate 5. Thus the tie-bar 50 normally serves to hold the plate 5 in a vertical position, as shown, for example, in Fig. 3, but the end of this bar may be bent upwardly to disengage the portion 51 from the slot 52, as indicated by dot and dash lines in Fig. 2, thus to release the plate 5, permitting it to swing downwardly around the pintle 4.

Similar parallel arms or angles 30 and 31 are secured by screw fastening means or the like to the uprights 5 and 2, providing horizontal legs which support a feed table, designated in general by numeral 35. This table preferably may be in the form of an aluminum casting and is provided with outstanding pins 36 which engage horizontal slots 37 (Fig. 4) in the outer ends of the vertical legs of the angles 30 and 31 (Fig. 4). Thus in the normal position of the feed table 35 its edges rest on the horizontal legs of the angles, while the pins 36 are disposed in the inner ends of the slots 37. The engagement of the pins 36 with the slots 37 is effective in itself substantially to prevent downward movement of the swinging upright 5 and removal of the rolls when the feed table occupies its normal position.

Integral extensions 39 of the table at each side thereof extend upwardly and support a cross-bar 40. Wires 41 have their ends fixed in the bar 40 and extend in parallel relation between the disks 8 of roll 7. These wires, as shown in Fig. 4, each have a portion inclining downwardly from the bar 40 to the region of the center of roll 7 and then have horizontal end portions which terminate at the side of the rolls opposite the feed table 35. The inner edge of table 35 supports a plurality of wires 42 which are substantially horizontal and are disposed in the grooves of the roller 9.

In the normal operation of a machine of this character the crank 20 is rotated, thus to rotate the rolls 7 and 9, and a slice of meat placed upon the feed table 35 has its edge portion inserted below the bar 40 so that it is engaged by the ribs of the roll 9 and the disks 8 of the roll 7. Thus the meat is not only provided with a plurality of parallel shallow cuts but is also kneaded or has its fibrous structure loosened by engagement with the ribbed roll 9. The meat is prevented from clinging to the rolls by the guide wires 41 and 42 which direct it between the rolls so that it may fall out at the rear of the machine onto a suitable receiving element, such as a tray, dish or piece of wrapping paper. If desired the meat may be passed between the rolls twice so that the cuts provided by the disks 8 may extend transverse of each other.

When it is desired to clean a machine of this character, it is merely necessary to remove the table 35 and the guide wires which it supports by moving the table forwardly to disengage the pins 36 from the slots 37 and to slide the wires 41 and 42 out of their normal positions between the rolls. Thereupon the resilient tie-bar 50 may be sprung upwardly, as shown in the dotted line position of Fig. 2, to release the end plate 5 so that the latter swings downwardly and is disengaged from the extensions of rolls 7 and 9. The opposite ends of the latter may then be slid out of engagement with the upright 2 and the crank 20 so that they are separated from the remainder of the machine for convenient cleaning. It is therefore evident that the parts of the machine including the feed table and guide means as well as the treating rolls may be readily separated from each other and the supporting frame to facilitate cleaning and that this operation does not involve the necessity for employing any tools such as wrenches, screw-drivers, pliers, or the like.

Obviously the parts may be reassembled in suitable position by reengaging the non-circular ends of rolls 7 and 9 with the hubs of the corresponding gears and by then swinging the plate 5 upwardly and bringing the openings therein into engagement with the corresponding axial extensions of the rolls. Thereupon the tie-bar 50 may be sprung into its normal position to hold the plate 5 in place and thereafter the feed table 35 may be restored to its normal position by merely sliding it inwardly upon the angles 30 and 31 until the pins 36 engage the notches 37. The crank 20 obviously may be quickly reengaged with the extension of the lower roll.

Fig. 5 illustrates the same general type of machine as that already described with the exception that the upper and lower rolls are provided respectively with disks $8^a$ and $9^a$. With this arrangement the marginal portions of the disks upon one shaft may project into the spaces between the disks upon the other shaft; in other words the sum of the radius of a disk on the lower shaft and of a disk upon the upper shaft is greater than the distance between their respective centers of rotation. These disks have radial slots spaced about their peripheries so that a continuous cut is not afforded thereby as the meat passes between the rolls, accordingly fibrous structure is opened up and partially separated, while cutting into separate strips is avoided.

It is evident that this invention affords a simple and effective machine for tendering meat and that this machine permits ready cleaning of all necessary parts thereof with a minimum of effort upon the part of the user.

I claim:

1. A meat tendering machine of the class described comprising a base, spaced uprights secured to the base, one of said uprights being pivotally connected to the base, a pair of treating rolls having their ends rotatably mounted upon the uprights, mechanism for rotating the rolls, parallel arms extending from the uprights, a feed table detachably mounted upon the said arms and said feed table having a planar body portion and a supporting bar spaced from said body portion, a set of guide wires projecting from the inner edge of said body portion between said rolls, and a second set of wires spaced from said first set and extending from said supporting bar between said rolls.

2. A meat tendering machine of the class described comprising a base, spaced uprights secured to the base, a pair of treating rolls having their ends rotatably mounted upon the uprights, said rolls having circumferential recesses, arms extending from the uprights, a feed table supported upon said arms, upper and lower sets of guide wires projecting from said feed table into the circumferential recesses of the treating rolls, thus providing guide means to direct a slice of meat from the table and between the rolls while preventing the meat from clinging to the rolls.

3. A meat tendering machine of the class described comprising a base, spaced uprights secured to the base, one of said uprights being fixed in relation to the base, gears rotatably mounted upon said upright, meat treating rolls having axial extensions in telescopic engagement with hub portions of said gears, means to rotate said gears and rolls, the other of said uprights being pivotally mounted upon the base, the rolls having axial extensions received in openings in said second named upright, substantially horizontal arms projecting from the respective uprights, and a feed table detachably secured upon said arms, said table normally being effective in preventing movement of the pivotal upright to release the rolls.

4. A meat tendering machine of the class described comprising a base, spaced uprights secured to the base, one of said uprights being fixed in relation to the base, gears rotatably mounted upon said upright, meat treating rolls having axial extensions in telescopic engagement with hub portions of said gears, means to rotate said gears and rolls, the other of said uprights being pivotally mounted upon the base, the rolls having axial extensions received in openings in said second named upright, substantially horizontal arms projecting from the respective uprights, a feed table detachably secured upon said arms, said table being effective in preventing movement of the pivotal upright to release the rolls when in its normal position, and a tie-bar extending between the upper parts of the uprights and normally effective in holding them in upright position.

5. A meat tendering machine of the class described comprising a base, spaced uprights secured to the base, a pair of treating rolls having their ends rotatably mounted upon the uprights, mechanism for rotating the rolls, arms extending in parallelism from the uprights and providing substantially horizontal flanges, a feed table slidably engageable with said flanges, said table having pins projecting from its opposite edges and engageable with notches in said arms, and guide means projecting from the table to the region of the rolls to direct meat therefrom between the rolls.

6. A meat tendering machine of the class described comprising a base, spaced uprights secured to the base, a pair of treating rolls having their ends rotatably mounted upon the uprights, mechanism for rotating the rolls, arms extending in parallelism from the uprights, a feed table slidably engageable with said arms, said table having integral upstanding arms supporting a crossbar, a plurality of wires projecting from the inner edge of the table between the rolls, and a plurality of other wires projecting from the crossbar between the rolls in spaced relation to the first-named wires whereby a slice of meat placed upon the table may be shoved below the bar and between the rolls and wires.

7. A meat tendering machine of the class described comprising a base, spaced uprights secured to the base, one of said uprights being fixed in relation to the base, gears rotatably mounted upon said upright, meat treating rolls having axial extensions in telescoping engagement with hub portions of said gears, means to rotate said gears and rolls, the other of said uprights being pivotally mounted upon the base, the rolls having axial extensions received in openings in said second named upright, and a resilient tie-bar fixed to the stationary upright and having an interlocking engagement with the upper part of the pivotally mounted upright, whereby the bar may be sprung to release the last-named upright and to permit its swinging so that the rolls may be disengaged from the uprights and removed for cleaning.

8. A meat tendering machine of the class described comprising a base, spaced uprights secured to the base, one of said uprights being fixed in relation to the base, gears rotatably mounted upon said upright, meat treating rolls having axial extensions in telescoping engagement with hub portions of said gears, means to rotate said gears and rolls, the other of said uprights being pivotally mounted upon the base, the rolls having axial extensions received in openings in said second named upright, a resilient tie-bar fixed to the stationary upright and having an interlocking engagement with the upper part of the pivotally mounted upright whereby the bar may be sprung to release the last-named upright and to permit its swinging so that the rolls may be disengaged from the uprights and removed for cleaning, substantially horizontal arms projecting from the uprights, and a feed table carrying guiding means extending between the rolls, said table being detachably connected to the arms and removable therefrom to permit such a swinging movement of the pivotally mounted upright whereby the table and guiding means, as well as the rolls, may be removed for cleaning.

LEON C. HUSE.